United States Patent [19]
Maestre

[11] Patent Number: 5,394,042
[45] Date of Patent: Feb. 28, 1995

[54] ANGULAR POSITION HOMOPOLAR RELUCTANCE SENSOR

[75] Inventor: Jean-Francois Maestre, Dijon, France

[73] Assignee: GEC Alsthom SA, Paris, France

[21] Appl. No.: 925,632

[22] Filed: Aug. 7, 1992

[30] Foreign Application Priority Data

Aug. 9, 1991 [FR] France .................. 91 10174

[51] Int. Cl.⁶ .................. H02K 11/00; H02K 16/02
[52] U.S. Cl. .................. 310/68 B; 310/114
[58] Field of Search .................. 310/68 B, 114, 111, 310/112, 115, 168, 193; 340/870.3, 870.31, 870.32; 324/207.13, 207.14, 207.15, 207.25, 207.16

[56] References Cited

U.S. PATENT DOCUMENTS

| | | | |
|---|---|---|---|
| 4,928,046 | 5/1990 | Karasawa | 310/111 X |
| 4,982,125 | 1/1991 | Shirakawa | 310/68 B X |
| 5,041,749 | 8/1991 | Gaser et al. | 310/68 B X |
| 5,243,279 | 9/1993 | Bajat et al. | 310/68 B X |

FOREIGN PATENT DOCUMENTS

| | | |
|---|---|---|
| 89-10533 | 8/1989 | France . |
| 0043044 | 2/1989 | Japan .................. 310/68 B |

*Primary Examiner*—Steven L. Stephan
*Assistant Examiner*—E. To
*Attorney, Agent, or Firm*—Sughrue, Mion, Zinn, Macpeak & Seas

[57] ABSTRACT

A homopolar reluctant sensor comprises a magnetic material rotor including a cylindrical body having at a first end a laminated part comprising the same number of lobes as there are sensor pole pairs and at a second end a ring and a magnetic material stator comprising a cylindrical portion provided with an excitation coil energized by an alternating supply, a first ring having notches and defining with said laminated part a first airgap and a smooth second ring defining with said rotor ring a second airgap. The stator notches are provided with a winding such that the voltage induced therein is sinusoidal and free of harmonics. The envelope of this voltage represents, apart from a phase-shift, the position of the rotor relative to the stator.

6 Claims, 4 Drawing Sheets

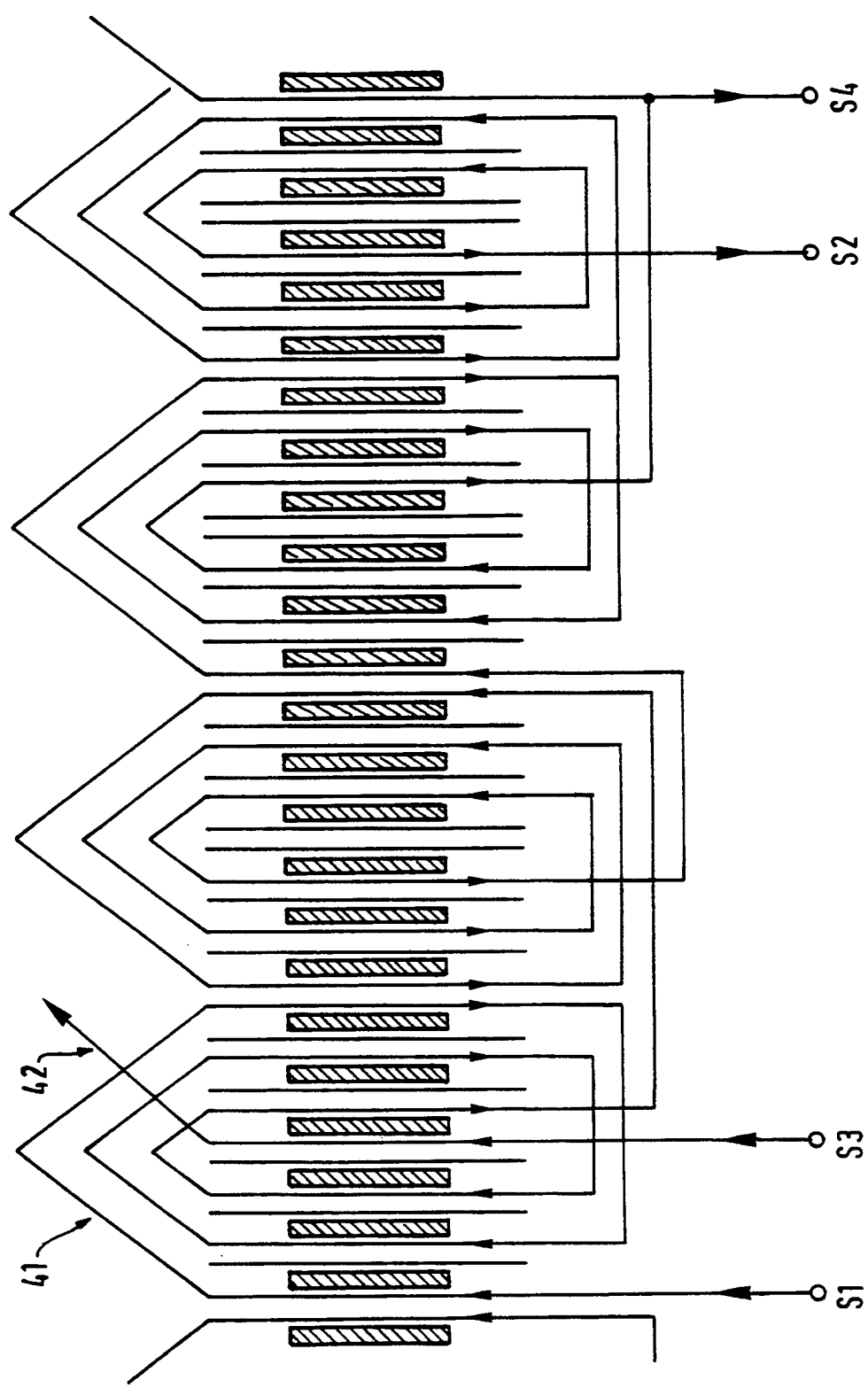

ANGULAR POSITION HOMOPOLAR RELUCTANCE SENSOR

BACKGROUND OF THE INVENTION

1. Field of the Invention

The present invention concerns a homopolar reluctant sensor designed to measure the position of a rotor relative to a stator.

The invention finds a particularly beneficial but not exclusive application in the field of electric motor control.

2. Description of the Prior Art

The Applicant's French patent application No 88 13 272 (now French Pat. No. 2,637,683) describes a device for measuring the angle of rotation of a motor rotor relative to its stator comprising 2n magnetic sensors disposed around a circumference fixed relative to the stator where n is the number of motor phases. Each sensor comprises a magnetic circuit provided with a send coil and a receive coil. The sensors are grouped in pairs in each of which the sensors are offset by 180 electrical degrees. These groups are regularly offset relative to each other by a geometrical angle equal to k/360/2p where k is an arbitrary number and p is the number of motor pole pairs. The send coils are all connected in series and energized by an alternating supply at a frequency between 2 and 15 kHz. The receive coils of the same group of sensors are connected in series. The envelope of the signals at the terminals of said sets of receive coils represents, apart from a phase-shift, the measured angle of rotation of said rotor.

One embodiment of the aforementioned sensor is described in detail in the Applicant's French certificate of addition No 89 10 533.

A sensor of this kind works well but is relatively costly to manufacture, especially in the case of sensors for motors with a small number of poles (less than six poles, for example).

One object of the present invention is to provide a low cost sensor, in particular a sensor for controlling motors with a small number of poles, without compromising the accuracy or reliability of operation.

SUMMARY OF THE INVENTION

The invention consists in a homopolar reluctant sensor comprising a magnetic material rotor including a cylindrical body having at a first end a laminated part comprising the same number of lobes as there are sensor pole pairs and at a second end a ring and a magnetic material stator comprising a cylindrical portion provided with an excitation coil energized by an alternating supply, a first ring having notches and defining with said laminated part a first airgap and a smooth second ring defining with said rotor ring a second airgap, wherein said stator notches are provided with a winding such that the voltage induced therein is sinusoidal and free of harmonics and the envelope of said voltage represents, apart from a phase-shift, the position of said rotor relative to said stator.

In one embodiment the stator winding comprises two coils forming two phases with a relative phase of 90 electrical degrees each of which is implemented in such a way that the number of conductors of the same phase varies in the notches in the most sinusoidal manner possible according to the electrical angle in order to reduce the winding coefficients of harmonics.

The invention will be better understood from the following description of one embodiment of the invention given with reference to the appended drawings.

BRIEF DESCRIPTION OF THE DRAWINGS

FIG. 3 is a diagram showing the stator winding.

DETAILED DESCRIPTION OF THE INVENTION

Figure 1:
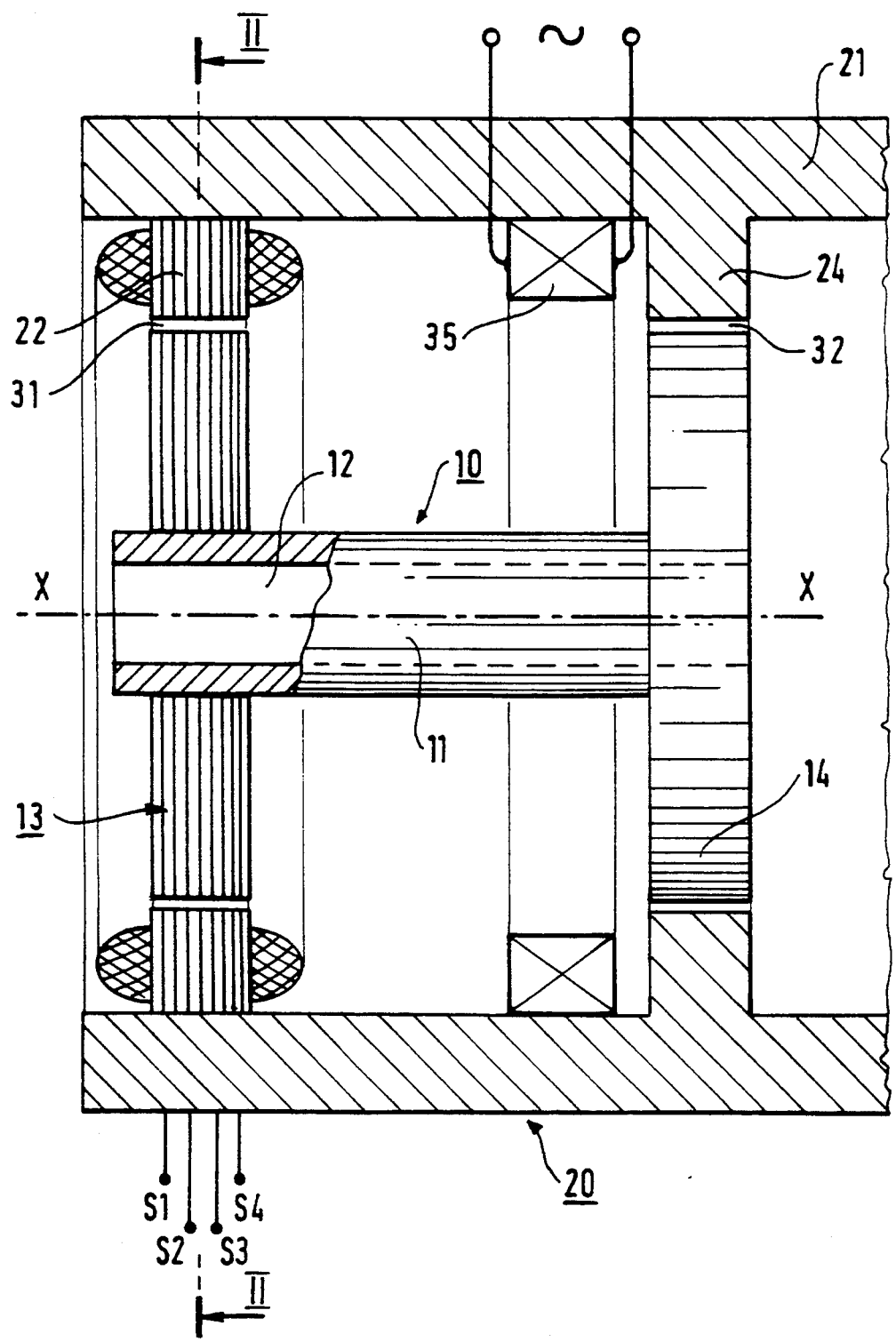
FIG. 1 is a diagrammatic view in axial cross-section of a sensor in accordance with the invention.
Figure 2:
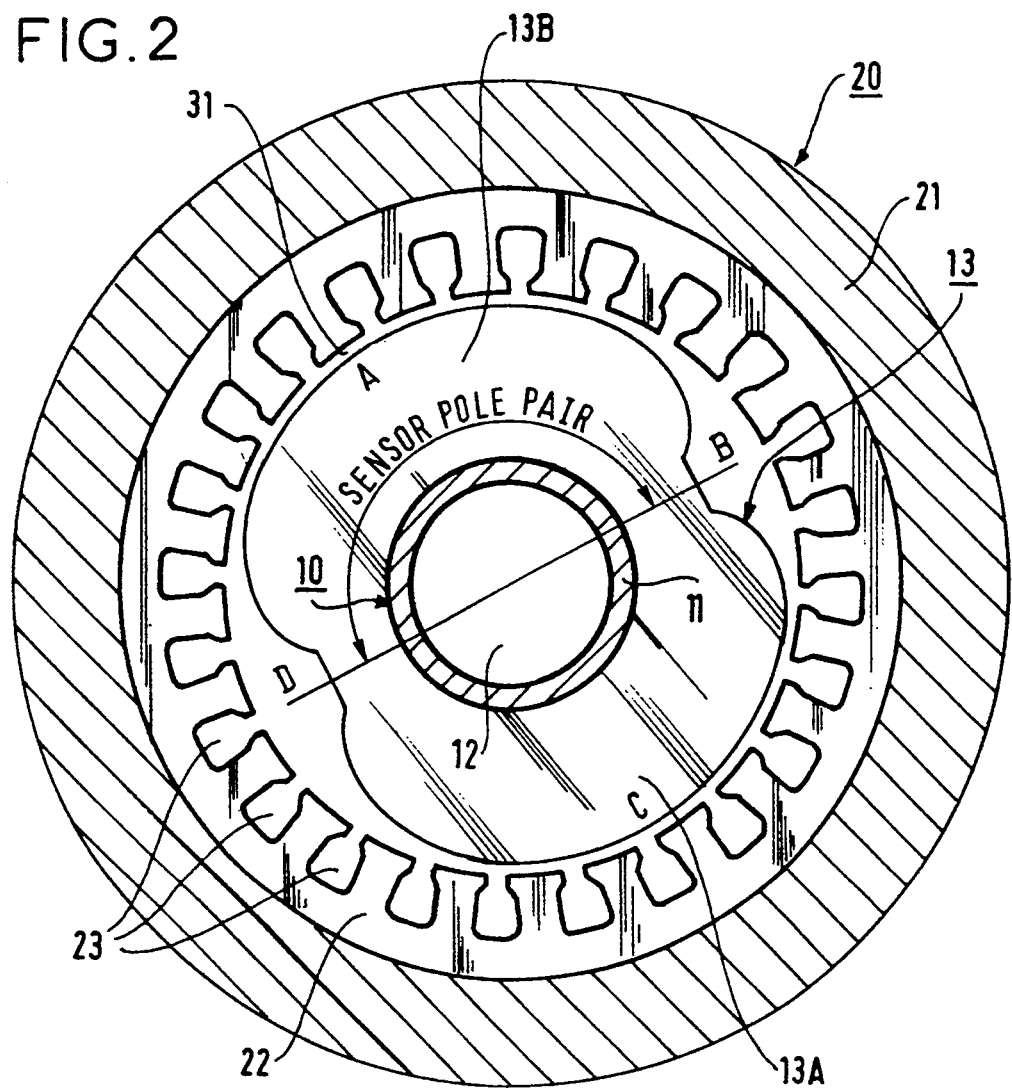
FIG. 2 is a view in cross-section on the line II—II in FIG. 1.
Figure 2A:
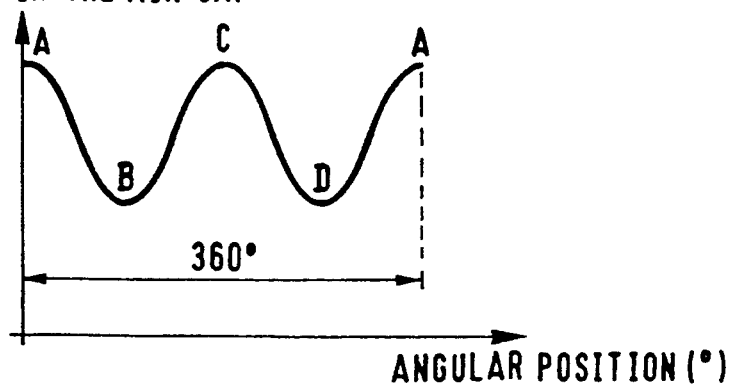
FIG. 2A is a graph illustrating the induction in the air gap of the sensor.

The embodiment of the invention described in detail hereinafter is a two-phase sensor with two pole pairs.

The sensor is in the shade of a body of revolution about an axis XX which is coincident with that of the motor which it controls. The sensor comprises a rotor and a stator both made from magnetic material.

The rotor 10 comprises a cylindrical body 11 incorporating an axial bore 12 so that it can be fitted to the shaft of the motor to be controlled; the rotor comprises at a first end of the body a laminated part 13 comprising lobes 13A and 13B, or more generally the same number of lobes as there are pole pairs in the sensor. These lobes are shaped so that the signal induced in the stator is as sinusoidal as possible. The rotor has a circular ring 14 at the other end of the body 12.

The stator 20 comprises a cylindrical part 21 having means (not shown) for fixing it to the stator of the motor to be controlled. A first ring 22 provided with notches 23 defines with the portion 13 of the rotor a first airgap 31. In this example there are 24 notches.

The stator comprises a second ring 24 defining with the stator ring 14 an airgap 32.

The cylindrical portion 21 of the stator has an excitation winding 35 energized by an alternating supply at a frequency between 1 and 20 kHz.

The stator ring 22 is provided with a two-phase winding, the number of conductors in the same phase varying in the notches as sinusoidally as possible. Consequently, the voltage induced by the excitation coil and by the rotation of the rotor is sinusoidal and free of harmonics (FIG. 4).

In this example a first coil 41 with ends s1–s2 comprises 71 turns for steps 1 through 7, 123 turns for steps 2 through 6 and 71 turns for steps 3 through 5. The stator comprises a second coil 42 with ends s3–s4 identical to the coil 41 but offset from it by 90 electrical degrees so that the induced voltage is in phase quadrature with that induced in the coil 41.

Figure 4:
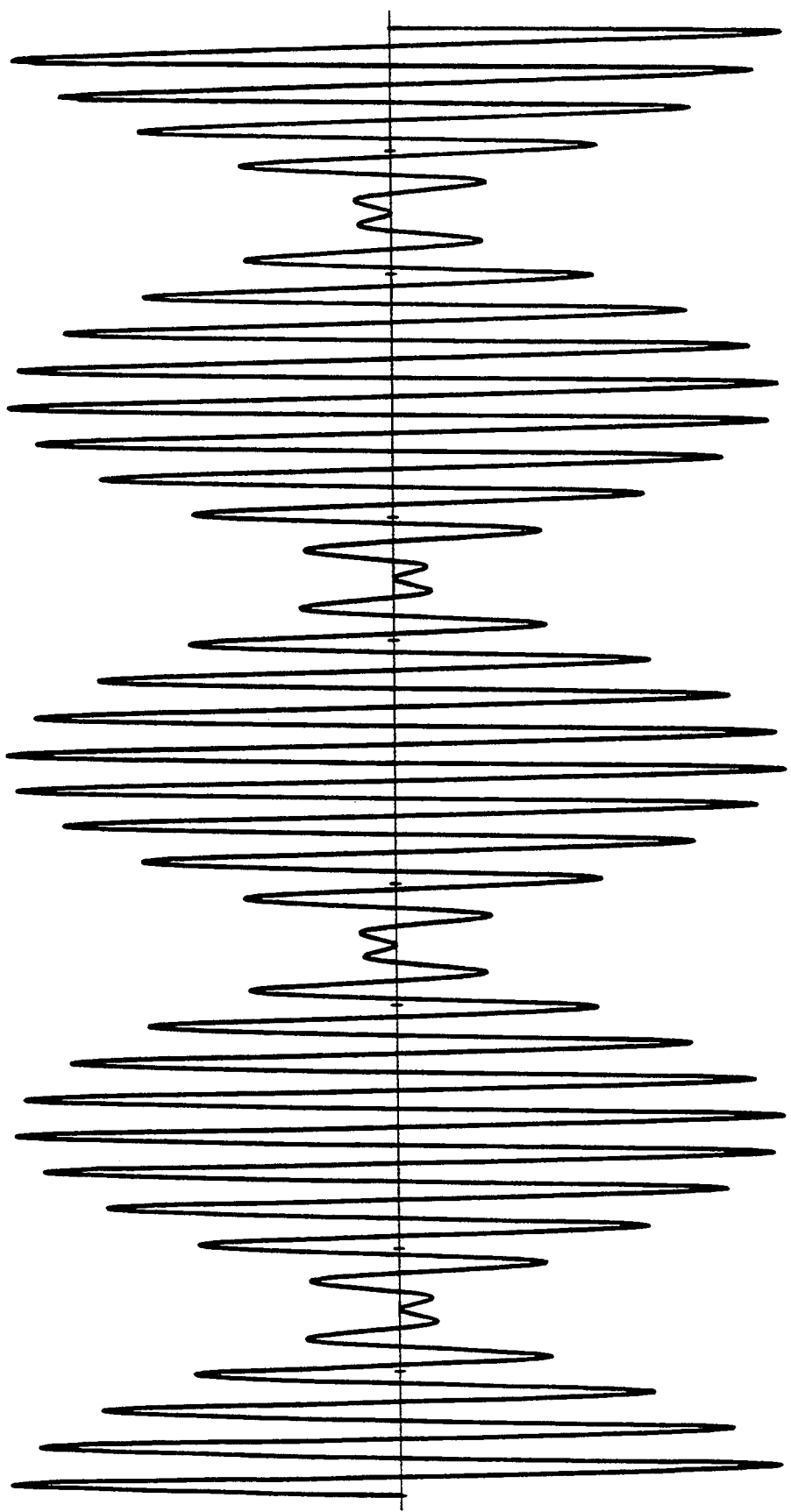
FIG. 4 is a diagram showing the sensor output signal.

The coils 41 and 42 form two phases offset by 90 electrical degrees and the signal across one of these phases, shown in FIG. 4, has an envelope which, apart from a phase-shift, represents the position of the rotor relative to the stator.

The invention is not limited to the example that has just been described.

In particular, the number of poles and the number of turns in the stator coils are chosen to obtain the optimum accuracy and the optimum sensitivity.

In another embodiment the stator winding comprises three coils offset by 120 electrical degrees defining a three-phase sensor.

The invention applies to the manufacture of control sensors for all sizes of motor, in particular small motors.

Also, the sensor can be used in a motor whose rotor is immersed in a hydraulic liquid, the sensor rotor being immersed along with the motor rotor.

There is claimed:

1. In a homopolar reluctant sensor having a number of sensor pole pairs, and comprising:

a magnetic material rotor (10) having an axis (XX) of rotation and comprising a cylindrical body (11) having, at a first end, a coaxial laminated part (13) with a number of lobes (13A, 13B) equal to said number of sensor pole pairs, and, at an opposite second end, a coaxial rotor ring (14); and a coaxial magnetic material stator (20) comprising a cylindrical portion provided with an excitation coil (35) energized by an alternating current supply, a first coaxial stator ring (22) having stator notches (23) and defining with said laminated part a first airgap (31), and a coaxial smooth second ring (24) defining with said rotor ring (14) a second airgap (32), wherein said stator notches (23) are provided with a stator winding (41, 42) wound in such a manner that the voltage induced therein is sinusoidal and free of harmonics, and that the envelope of said voltage represents, apart from a phase-shift, an angular position of said rotor (10) relative to said stator (20).

2. Sensor according to claim 1 wherein said stator winding comprises two coils offset by 90 electrical degrees providing a two-phase sensor.

3. Sensor according to claim 1 wherein said stator winding comprises three coils offset by 120 electrical degrees providing a three-phase sensor.

4. Sensor according to claim 1 wherein said excitation coil is energized by a sinusoidal voltage at a frequency between 1 and 20 kHz.

5. Sensor according to claim 1, wherein said rotor is free of any winding.

6. Sensor according to claim 5, wherein said first airgap (31) is nonuniform.

* * * * *